United States Patent

[11] 3,598,930

[72] Inventor Arnold B. Desnoes
Massapequa, N.Y.
[21] Appl. No. 765,765
[22] Filed Oct. 8, 1968
[45] Patented Aug. 10, 1971
[73] Assignee Puregas Equipment Corp.
Copiague L.I., N.Y.

[54] CABLE PRESSURE ALARM SYSTEM
4 Claims, 4 Drawing Figs.

[52] U.S. Cl. ............ 179/175.3
[51] Int. Cl. ............ H04b 3/46
[50] Field of Search ............ 179/175.3, 175.2 C, 1

[56] References Cited
UNITED STATES PATENTS
3,360,617 12/1967 Munson ............ 179/175.3
3,444,336 5/1969 Holt et al. ............ 179/175.3

*Primary Examiner*—Kathleen H. Claffy
*Assistant Examiner*—Douglas W. Olms
*Attorney*—Kane, Dalsimer, Kane, Sullivan and Kurucz

ABSTRACT: A line alarm system for the dual use of a telephone subscriber's cable pair which is capable of functioning at all times, other than periods of regular telephone service, as an alarm-monitoring circuit for indication of remote faults. A contactor and a high value series resistance which, upon operation shunts the telephone unit. A relay sensitive to the operation of the contactor and the consequent small current flow to provide an alarm, a second relay responsive to a subscriber initiated telephone call and a larger current flow, and a third relay responsive to operation of the second relay as well as a subscriber directed telephone call to eliminate said alarm during times of normal telephone usage.

INVENTOR
ARNOLD B. DESNOES
BY
Lane, Aitken, Dunner & Ziems... (signature) Lane, Dalsimer, Lane, Sullivan & Smith
ATTORNEYS INVENTOR
ARNOLD B. DESNOES
BY
Kane, Dalsimer, Kane, Sullivan & Smith
ATTORNEYS

CABLE PRESSURE ALARM SYSTEM

This invention relates to an alarm system wherein a fault in the form of, for example, an increase or decrease of pressure is monitored at a remote location and, by means of a dual use of a cable pair disposed within a length of cable, is sensed at a proximal location. In general, the present invention relates to a line alarm circuit wherein a cable pair is used for regular telephone service and as a monitor for cable pressure or other indicating purposes.

While the present invention is directed to a specific adaptation of a line alarm circuit for monitoring pressure faults in telephone cables without interference with customer usage, the discussion which follows will also have application in other diverse environments to detect and monitor other faults or occurrences and serve other important services. In this connection, the principles of a line alarm circuit, hereinafter to be discussed, may be adapted for application in, for example, fire detection, detection of unauthorized persons in unauthorized areas, detection of abnormal levels of liquids, to name only a few. Thus, the present discussion is only for the purpose of providing an exemplary application of the invention and is not deemed to be limiting in any sense. And, while the circuit shown and described is adapted for operation on an open circuit basis, it could equally well operate on a closed circuit basis, and the adaptation is considered to be within the scope of the invention and the following description.

At the present time, telephone cables are pressurized and pressure-sealed primarily to prevent moisture from entering the inner confines of the cable and interfering with service. This objective has been attained by the introduction and maintenance of some minimum cable pressure throughout the cable network which may stretch for long distances. Success has been achieved through the use of dry air or nitrogen gas under pressure. Generally, the total network is subdivided providing a multiplicity of sections and internal pressure chambers. Thus, a failure in one section of the network may be localized to that section and detected.

A failure or drop in cable pressure within any one of the multiplicity of sections may occur due to a fault in the form of a break in the cable sheath by any cause whatever as well as a result of the general downward variance of pressure due to distributed loses. Pressure losses of the latter type are generally thought to be nonpreventable merely from economic considerations since the cause of pressure loss may be difficult to locate and repair. To provide a response upon the downward drift of cable pressure to a value below a predetermined minimum the industry has employed a pneumatically operated electrical switch which is commonly referred to as a Pressure Guard. Switches of this type may be disposed at predetermined locations along the cable network and generally within or associated with each of the multiplicity of sections thereby to monitor and respond to downward pressure changes in the section. Thus, the line alarm circuit enables an alarm to be received at a remote central location when any one of several Pressure Guards operates due to loss of gas cable pressure within the cable network.

The prior art contains examples of various systems now in common usage by which a remote pressure failure within a section of a cable of the aforementioned type may be monitored by a pressure device, such a pneumatic switch, whereby an indication of the fault is electrically transmitted, sensed and/or recorded at a central facility.

Monitoring may be carried out systematically or on a haphazard basis. Thus, while it would be possible to monitor cable pressure by directly connecting pressure gauges to valves located at determinant locations along a cable network, labor costs as well as inadequacy of occasional coverage at the locations rule out procedure of this type. Therefore, the industry has moved in the direction of a system which may continuously or periodically monitor a cable thereby to substantially aid in obviating the possibility of the cable undergoing serious damage caused by water or moisture.

Generally, the prior art has been directed toward the end of obtaining alarm indications from a pressure responsive element by the use of a pair of conductors within a cable dedicated solely to an alarm function, the dual use of a subscriber or working pair of cables both for alarm and voice transmission functions, and by the use of a contactor placing, due to a pressure fault, a high resistance shunt across a subscriber installation. Such a shunt will not interfere with the normal functioning of the line with regard to transmission, ringing, pulsing and supervision and the resistance will be detected when the line is tested by the Automatic Line Insulation Equipment (ALIT).

Both the former and the latter of the above-mentioned systems may be advantageously employed. However, the application of these systems is not without disadvantage. In brief, while the former method adequately operates to both bring in an immediate alarm indication of a fault as well as providing proper identification and location of the fault monitored, the method unfortunately requires the use of a cable pair dedicated solely to an alarm function. Undoubtedly there is no question of a system of this type usurping a subscribing customer's cable pair. However, dedicated cable pairs, at least in crowded environments, generally are not available or cost factors rule out the use of a dedicated pair. In this connection, this type of a system is generally thought of as being economically impractical. With regard to the latter system, it is considered that universal application throughout the country is impossible. Thus, irrespective of the fact that the system only employs a shunt resistance in addition to a contactor, the automatic equipment is complex and costly. Thus, small exchange areas necessarily must direct their attention elsewhere. A further disadvantage may be the necessity to scan on a one-time-per-day basis, and usually during early morning hours, which are slack operating periods. While a practice of this type allows a far greater percentage of lines to be scanned—the line cannot be scanned when in operation—to determine possible faults, many faults which may occur within the cable network can go undetected for long periods of time. During this time severe damage may occur in the cable itself which could otherwise have been quickly detected by a continuous monitoring procedure and equipment.

In view of the foregoing, the dual use of a subscriber cable pair has received acceptance within the industry. At the same time, certain problems are recognized and many of the prior art systems are subject to disadvantages. One of the most prominent of the disadvantages being line disturbances caused by low ohmic sensing resistances which shunt the subscriber's line upon motivation of the Pressure Guard.

Other schemes for obtaining what is essentially a telegraph signalling channel superimposed on a telephone line without mutual interference have been designed over the years. These, briefly, are simplex circuits, duplex circuits, differential duplex circuits, frequency slot and frequency sharing. The schemes, exclusive of the frequency sharing method, are complex and do not lend themselves for use with a dial line. While the latter method may have application in the environment now discussed, it is considered that for alarm purposes it is too costly for it to be attractive. It is, therefore, an object of this invention to provide a line alarm circuit which monitors cable faults with a minimum of line disturbance and cost.

It is another object of this invention to provide a line alarm circuit which borrows the cable conductors of a customer's line at all times when that line is not used either to make a call or receive an incoming call for alarm functions, yet immediately relinquishes the customer's line during regular usage of the same so as not to interfere with this usage.

It is a further object of the invention to provide a line alarm circuit responsive to remote pressure variations within a telephone cable and adapted to display a visual and audible indication at a proximal alarm center indicative of said pressure variation.

Other objects and advantages of the present invention will become clear to those skilled in the art as the following description is developed.

To carry out the objects and achieve the advantages aforedescribed and which will later appear, the invention generally contemplates a line alarm circuit which indicates a fault at a central installation in response to the operation of a contactor. Contactor operation and a resultant high resistance shunting of a telephone unit is sensed by a relay and by means of a circuit, through a closed relay switch, which operates a pair of alarms, one immediately and the other after a predetermined time delay. A second relay is responsive to subscriber use of the line in the form of an outgoing call to provide a resistance ground on the ring line as well as to energize a third relay and open the alarm circuit thereby allowing regular telephone service. The third relay, additionally is independently energized by an incoming call providing the same function yet closing said circuit at all other times thereby allowing the dual use of a telephone subscriber's cable pair.

The accompanying drawings illustrate a preferred embodiment of the present invention. By the drawings.

Figure 1:
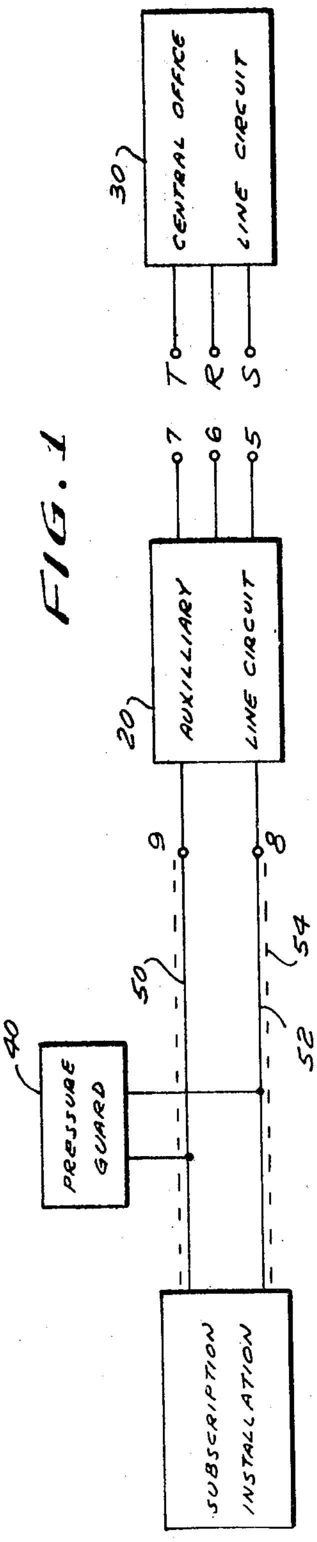
FIG. 1 is a block diagrammatical presentation of the total telephone system incorporating the teaching of the present invention.

Generally, the drawing figures and the discussion to follow illustrate and relate to a line alarm testing system whereby indications caused by cable pressure faults at locations along a cable network may be visually and/or audibly detected and monitored at a terminal or central office location.

Figure 3:
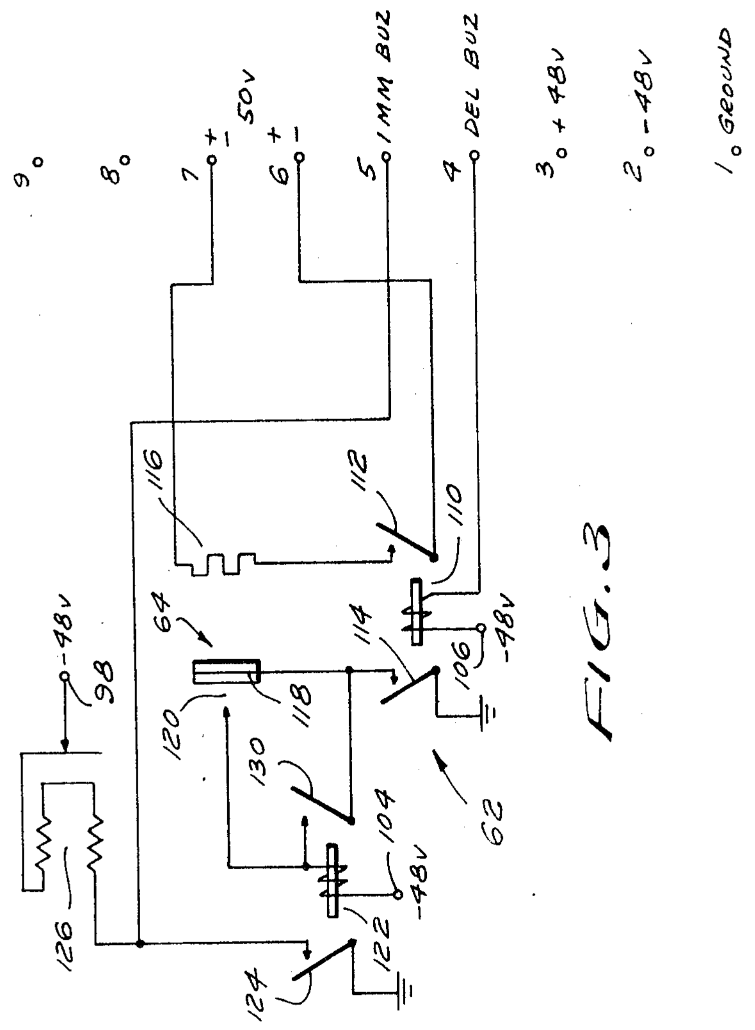
FIG. 3 is a schematic presentation of a time delay circuit for use with the auxiliary line circuit; and, FIG. 4 is a schematic presentation of a contactor circuit located within the telephone system for response to pressure variations.
Figure 4:
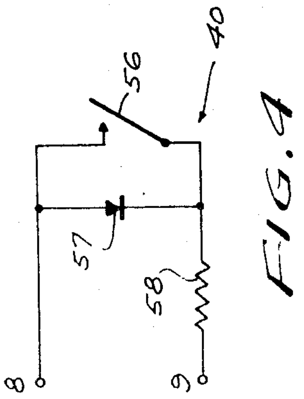
Figure 2:
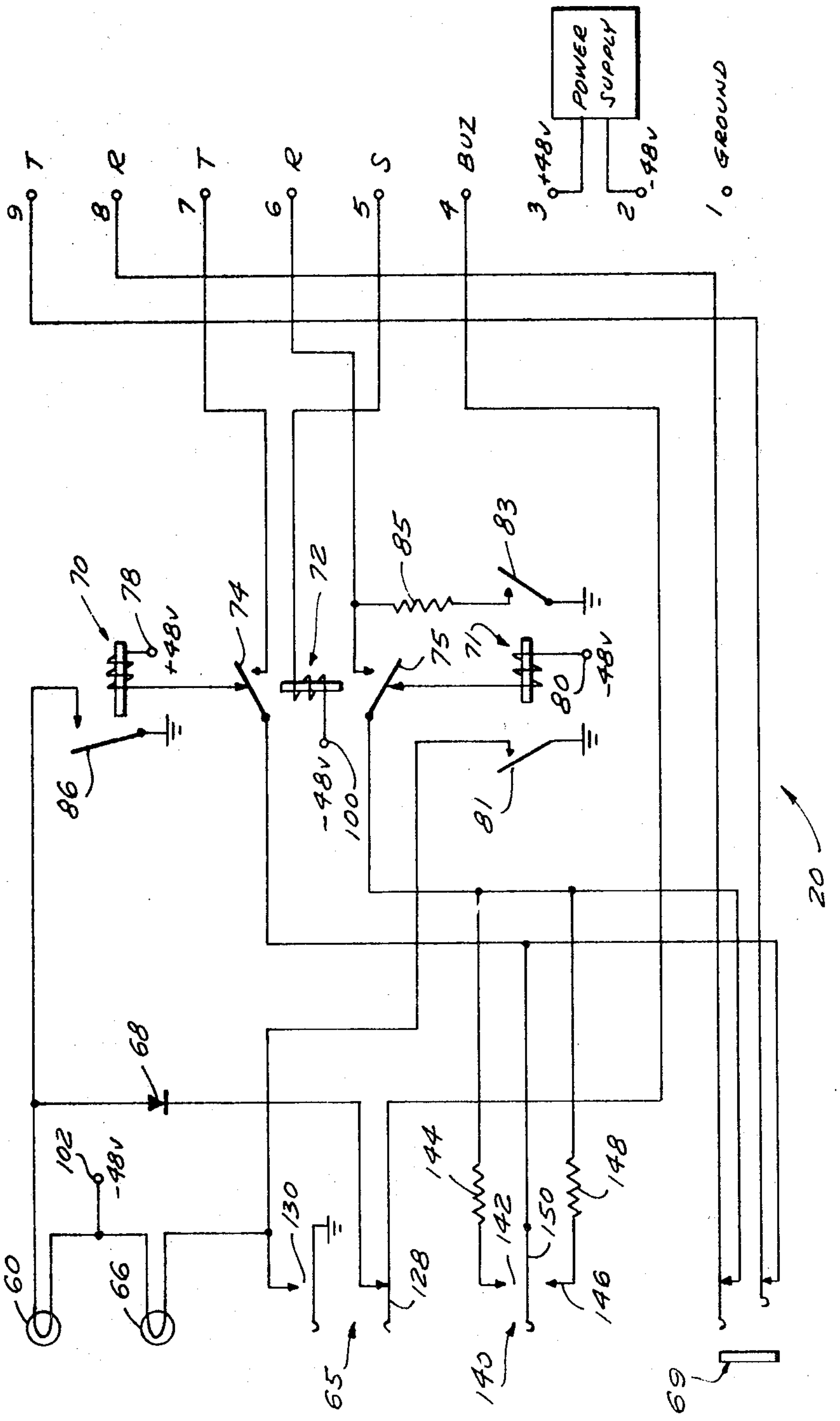
FIG. 2 is a schematic presentation of an auxiliary line circuit allowing dual use of a subscriber telephone line for regular service and for an alarm function.

The total system comprises a subscriber installation 10 including a conventional telephone receiver or similar unit (not shown); an auxiliary line circuit 20 for cable pressure alarms, and a central office line circuit 30. The aforementioned are illustrated in block diagram form in FIG. 1. As may be apparent and as is contemplated herein, a group of auxiliary line circuits may be installed in a central office. These circuits may be cross-connected at the distributing frame to certain telephone lines, as desired. A single power source is capable of supplying power to a multiple of line circuits serving one of many monitoring installations along the extended length of the cable network, only one of which is shown. Additionally, a single alarm and time delay circuit may be common to several auxiliary line circuits. The power source, denoted by the numeral 32 in FIG. 2, is considered to be of conventional construction and makeup and within the scope of knowledge of those versed in the art. Thus, no further discussion is directed to this feature. The time delay and alarm circuit will be discussed in relation to FIG. 3 as the complete operation of the circuit is developed.

Generally, the monitoring installations are spaced at distances from approximately 1 to 2 miles apart. A typical orientation of a monitor, denoted by the numeral 40, may be seen in FIG. 1. The monitor is connected to the auxiliary line circuit 20 by means of the subscriber cable pairs 50—52 disposed within the pressurized cable 54. The cable is shown by the dash lines between the subscriber installation and the terminals 8, 9 on the line circuit. As may be apparent from the previous discussion, the monitor is in fluid pressure communication with the internal chamber of the cable 54 thereby to respond to the changes in pressure therein.

The monitor includes a pressure responsive switching mechanism, schematically illustrated by the numeral 56, and a series resistor 58, electrically connected in parallel with the telephone receiver. The switch 56 is shown to be normally open and, in the pressure environment, closes to place a high resistance shunt across the subscriber's line when a cable pressure variation, below a minimum, is sensed. As previously averted to, the switch might also by normally closed so that the high resistance shunt is normally present yet removed from the circuit, again, when pressure falls as described. The circuit would necessarily be modified to accommodate this change but the operation would be substantially similar. The latter operation may be employed to advantage in an adaptation wherein the monitor monitors an unauthorized entrance by a burglar and to prevent detection the burglar has cut the telephone cable which opens the circuit as would be the case when the monitor functioned.

As previously indicated, the switch 56 may be a unit commonly referred to as a Pressure Guard. In the application here intended, the switch will be, at least, waterproof and include a snap-action mechanism responsive to either the expansion or contraction of a bellows or an equivalent device, such as a Bourdon tube. The present switch unit is of a type sold under the identification PEC523, PEC524 and PEC525 by Puregas Equipment Corp. Copiague, Long Island, New York. However, the switch unit has been modified slightly to meet the exigencies of the present invention. In this connection, the disclosed pair of series 270 K ohm resistors have been replaced by a single 100 K ohm resistor 58. Further, the switch unit includes a diode 57. In this manner, the presence or absence of the proper resistance may be checked by passing current through the terminals 8, 9 and then reversing the current. For further information, reference may be had to Puregas Bulletin PG523–5 of Apr. 1964.

The switch is associated with individual pressurized chambers along the cable network and responsive to a drop in gas pressure below a predetermined minimum thereby to shunt the subscriber station 10 with the resistance 58. The resistance, placed across the line 50—52 will be appropriately high, as discussed, thereby not to interfere with the usual functions of transmission, ringing, pulsing and supervision of the subscriber's unit.

In the particular embodiment contemplated, each Pressure Guard will be assigned a number, location and cable pair assignment, so that when no alarm condition is registered, crews may be dispatched to the area indicated for leak-locating activity and a reestablishment of objective pressure levels in the cable section.

The auxiliary line circuit 20 may include a visual alarm in the form of a red incandescent lamp 60. An audible alarm unit 62 including a conventional buzzer arrangement will be described in more detail hereinafter. This alarm unit includes a time delay relay 64 provided to delay the operation of the buzzer after a visual indication for any predetermined period as, for example, 3 minutes. This delay, of course, is a matter of particular choice and other periods of time may be deemed more appropriate.

Other circuits, referring to FIG. 2 may be adapted to be connected within the auxiliary line circuit to provide testing functions. Briefly, these may include an acknowledge key or switch 65 to allow, after the time delay period and upon operation of the buzzer, the audible signal to be silenced and replaced by a white incandescent acknowledge lamp 66. Additionally, a test key 67 may be provided in the circuit to allow maintenance personnel to check proper line and alarm operation of the circuit. Further, the circuit may provide a test jack 69 to enable testing of line conductor 58, as discussed. Circuits of this type are generally conventional. However, further discussion will be directed to this feature of operation, below. Additionally, and for further information, attention is directed to Puregas Equipment Corp. Bulletin 521-2. This bulletin further discussed the alarm panel and other appropriate tests which may be accomplished to check the total operation of the alarm system after the installation has been completed. Additionally, there is a discussion as to the procedure for measuring the line loop resistance to each Pressure Guard on an alarm pair using conventional line loop resistance measurement techniques and measuring at the test jack.

As shown, the alarm portion of the auxiliary line circuit includes a small diode 68 which is provided for the usual function.

The auxiliary line circuit 20 includes three relays 70, 71 and 72. The former relay is provided in series with terminal 9 and the tip ("T") side of the line by means of the normally closed continuity switch contacts 74 of relay 72. Relay 71 is provided in series with terminal 8 and the ring ("R") side of the line by means of the normally closed continuity contacts 75 of relay 72. Relay 72 is provided in series with terminal 5 ("S") and is the sleeve or S relay. Relay 70 is the alarm relay while relay 71 is the line relay and are, respectively, the sensitive and marginal relays.

The power source 32 indicated a positive 48 volt potential at panel terminal 3 and this voltage is applied at terminal 78 on the T side of the line through continuity contacts 74. A negative 48 volt potential at panel terminal 2 is applied at terminal 80 on the R side of the line through the continuity contacts 75. A line potential of 96 volts is provided across R and T. A negative 48 volt potential is also applied at terminals 100, 102, 104 and 106.

Having the foregoing information in mind, it is considered that the circuit operation will become more meaningful. When the telephone unit is inoperative and under normal pressure fault within the pressurized cable 54, the marginal relay 71 as well as the sensitive relay 70, across the voltage source and the subscriber line 50—52 are inoperative, and there is no circuit operation.

As hereinafter discussed, the marginal relay detects a customer-originated telephone call and the sensitive relay, sensitive to a one-half milliampere current flow, detects the closure of alarm contact 56. Relay 70 may be of any type capable of responding to extremely small currents. Polar relays generally are responsive in this range. In the present invention, consideration of component characteristics is necessary to provide adequate sensitivity and margin whereby relay 71 will remain unaffected by an alarm indication yet be responsive to a customer-originated call.

Continuing under normal conditions, as above, an outgoing call causes both relay 70 and relay 71 to operate. The marginal relay operates upon sensing currents of approximately 10 milliamperes or more in the line. Thus, the marginal relay, assuming no subscriber use of the line, will not respond upon a closing of the contactor 56. This is an important feature of the invention.

As will be apparent from the discussion to follow, operation of relay 70 and a closure of switch 86 illuminates the alarm lamp 60 (no buzzer sounding until the completion of the time delay period) whereas operation of relay 71 and the consequent closure of switches 81 and 83 grounds the ring terminal 6 through a resistance 85. While not shown, this causes the central office line circuit 30 to function and it places a resistance ground on sleeve terminal 5. An immediate result is the operation of sleeve relay 72 and a reversal of position of continuity switches 74 and 75 providing a direct short between terminals 7, 9 and 6, 8. All alarm functions are immediately discontinued. Further, the illumination of lamp 60 is only momentary.

When contactor 56 closes, the large resistance is placed across the line 50—52. Upon closing of switch 56, a small current (approximately 1 milliampere) flows through the line between terminals 8, 9. The sensitive relay 70 operates and relay switch 86 closes to ground lamp 60. Relay 71 remains inoperative.

The fault occurrence is also indicated by an audible signal after the expiration of a delay period, during which time the monitored fault must persist.

Closed switch 86 impresses a ground potential on terminal 4 of both the alarm circuit and the auxiliary line circuit so that relay 110 operates and relay switches 112 and 114 close, the former closing the circuit through heater 116. After the delay period, determined by the length of time necessary for the bimetallic element 118 or the equivalent to momentarily close switch 120, relay 122 operates, switch 124 closes and buzzer 126 sounds. Switch 130 also closes thereby to connect terminal 104 to ground.

As previously indicated, the audible alarm circuit may be manually opened; the buzzer indication being replaced by illuminating the white incandescent lamp 66. In this connection, the normally closed contacts 128 of acknowledge switch 65 are opened and the normally open contacts 130 are closed to ground.

The discussion has already developed the sequence of events obtaining when the customer originates a telephone call. Thus, irrespective of the operative state of relay 71 and/or 70, a resistive ground is placed on terminal 6 with consequent operation of the sleeve relay 72. If the telephone call is an incoming one, the central office equipment immediately seizes the line to operate the sleeve relay 72 thereby cutting through the line and disconnecting the alarm indicating equipment to allow usage of the subscriber line without the possibility of alarm indication.

Once the call either incoming or outgoing, is terminated, the alarm function may resume since the office line circuit 30 and consequently sleeve relay 72 together with marginal or line relay 71 will be inoperative. Thus, the alarm and acknowledge lamps 60 and 66 may immediately light or else, and in place of lamp 66, the buzzer may sound after the delay period.

The circuit 20 also provides a test circuit 140 for testing both the line 142 through a resistance 144 and the alarm 146 through a resistance 148. Movement of the common actuator 150 toward the line 142 causes approximately 10 milliamperes of current flow through relays 70 and 71 to cause both to operate thereby simulating an outgoing telephone and resultant operation of the sleeve relay to eliminate the momentary alarm lamp indication.

Movement of the actuator toward line 146 tests the line. In this condition approximately one milliampere of current flows through the auxiliary line circuit. As indicated, relay 71 fails to operate at this value of current flow while relay 70 does operate to provide an immediate and a delayed alarm function. After the delay period the acknowledge lamp 66 may be tested.

The components in this embodiment may take the following illustrative values:

| | |
|---|---|
| **Telephone 10** | 300 ohms max. |
| **Diode 57** | Blocking Diode Max. 100 m.a forward p.i.v. 200 volts |
| **Resistor 58** | 100 K ohms |
| **Lamp 60** | Incandescent bulb |
| **Lamp 66** | (same as Lamp **60**) |
| **Diode 68** | (same as Diode **57**) |
| **Relay 70** | 5000 ohms break-make 0.00045 amps |
| **Relay 71** | 2500 ohms 2 transfers 0.010 amps |
| **Relay 72** | (same as Relay **71**) |
| **Resistor 85** | 400 ohms |
| **Relay 110** | (same as Relay **71**) |
| **Relay 122** | (same as Relay **71**) |
| **Resistor 144** | 1,200 ohms |
| **Resistor 148** | 100 K ohms |
| **Voltage** | ±48 volts |

From the foregoing, it should be apparent that the several objects and advantages of the invention are carried out. While the discussion has been directed to what may be considered a preferred embodiment of the invention, this discussion is meant for the purpose of illustration only and not for the purpose of limiting the invention other than to that which is defined by the claims to include all of the several changes and modifications that are within the skill of the art.

I claim:

1. In the combination with a cable network enclosing at least one subscriber telephone line pair and defined by a multiplicity of adjoining pressurized chamber sections of a line alarm system for monitoring cable pressure within the line sections and adapted, upon a drop in cable pressure below a predetermined safety minimum to provide a fault indication on a centralized alarm panel, said alarm system comprising; means responsive to a drop in said cable pressure, said responsive means including a resistance element of substantially greater value than the normal resistance through the subscriber unit electrically connected across a subscriber telephone line pair, and telephone unit and including means for imparting to the line a continuous voltage of substantially greater value than the normal line voltage, said responsive means being adapted to respond to said drop in cable pressure below said predetermined minimum to provide a determinate line resistance and a line current, alarm means, relay means responsive to said line current for activating said alarm means at said central panel, switch means electrically connecting said relay means to said alarm means, and means responsive to either a subscriber originated telephone call or an incoming telephone call on said subscriber telephone line and a consequent change in line resistance and line current for opening said switch thereby to provide a drop to normal line voltage and to eliminate said alarm means from the subscriber telephone line and allow freedom of use.

2. The combination of claim 1 wherein said relay is sensitive to currents of at least approximately one-half milliampere.

3. The combination of claim 1 wherein said means responsive to subscriber originated use of said line is a line relay responsive to current values exceeding one-half milliampere and a sleeve relay responsive to an incoming telephone call on said subscriber line and to a response of said line relay.

4. The combination of claim 1 wherein operation of said sleeve relay functions to open said switch means whereby said alarm means is eliminated from said subscriber line.